United States Patent [19]
Gilmore et al.

[11] Patent Number: 5,522,670
[45] Date of Patent: Jun. 4, 1996

[54] HITCHING MECHANISM

[75] Inventors: Kenneth G. Gilmore, Redwood City; Michael R. Lax, Concord; Russell A. McDonald, Tollhouse, all of Calif.

[73] Assignee: Granite Rock Company, Watsonville, Calif.

[21] Appl. No.: 403,369

[22] Filed: Mar. 15, 1995

[51] Int. Cl.[6] .................................................. E01C 19/00
[52] U.S. Cl. .......................... 404/83; 404/86; 404/101; 56/15.9; 37/231
[58] Field of Search ................................ 56/14.9, 15.5, 56/15.6, 15.7, 15.8, 15.9, 16.2, DIG. 4; 37/231, 235, 468; 172/272; 404/83, 85, 86, 101

[56] References Cited

U.S. PATENT DOCUMENTS 5,381,647  1/1995  Eberle .................................. 56/15.8

Primary Examiner—Ramon S. Britts
Assistant Examiner—Pamela A. O'Connor
Attorney, Agent, or Firm—Townsend and Townsend and Crew

[57] ABSTRACT

The invention provides a connector for removably connecting a first piece of equipment to a second piece of equipment. The connector includes a rigid body having a back end and a front end. Means are provided at the back end of the body and are adaptable for slidable engagement in a vertical direction with the first piece of equipment. At least one axially translatable member is provided at the front end of the rigid body, with the translatable member being translatable between an insertion position and engagement position. The translatable member is adapted for engagement with the second piece of equipment when in the engagement position. A means is provided which is operable from a location away from the body for translating the translatable member between the insertion position and the engagement position.

22 Claims, 5 Drawing Sheets

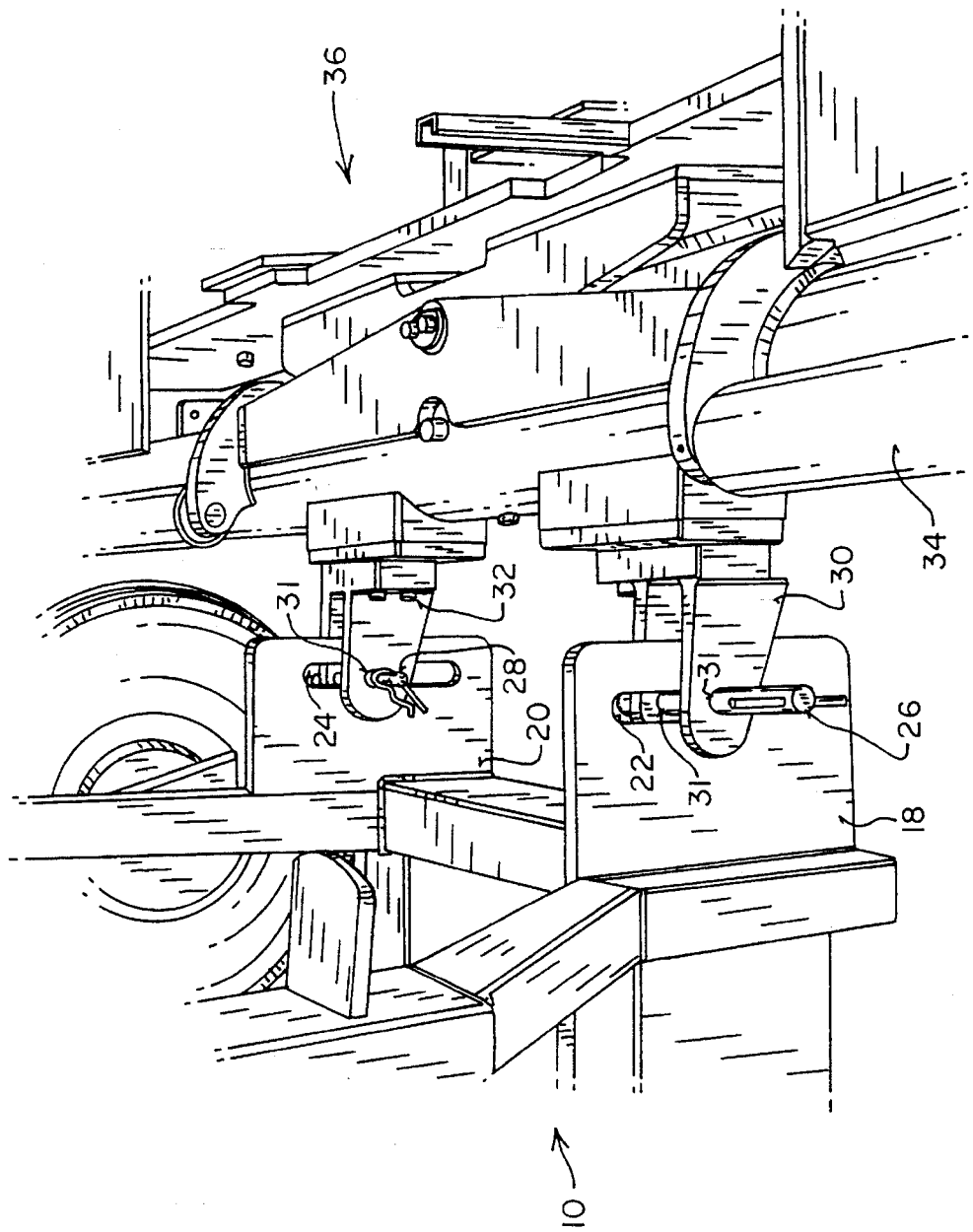
FIG_2 (PRIOR ART)

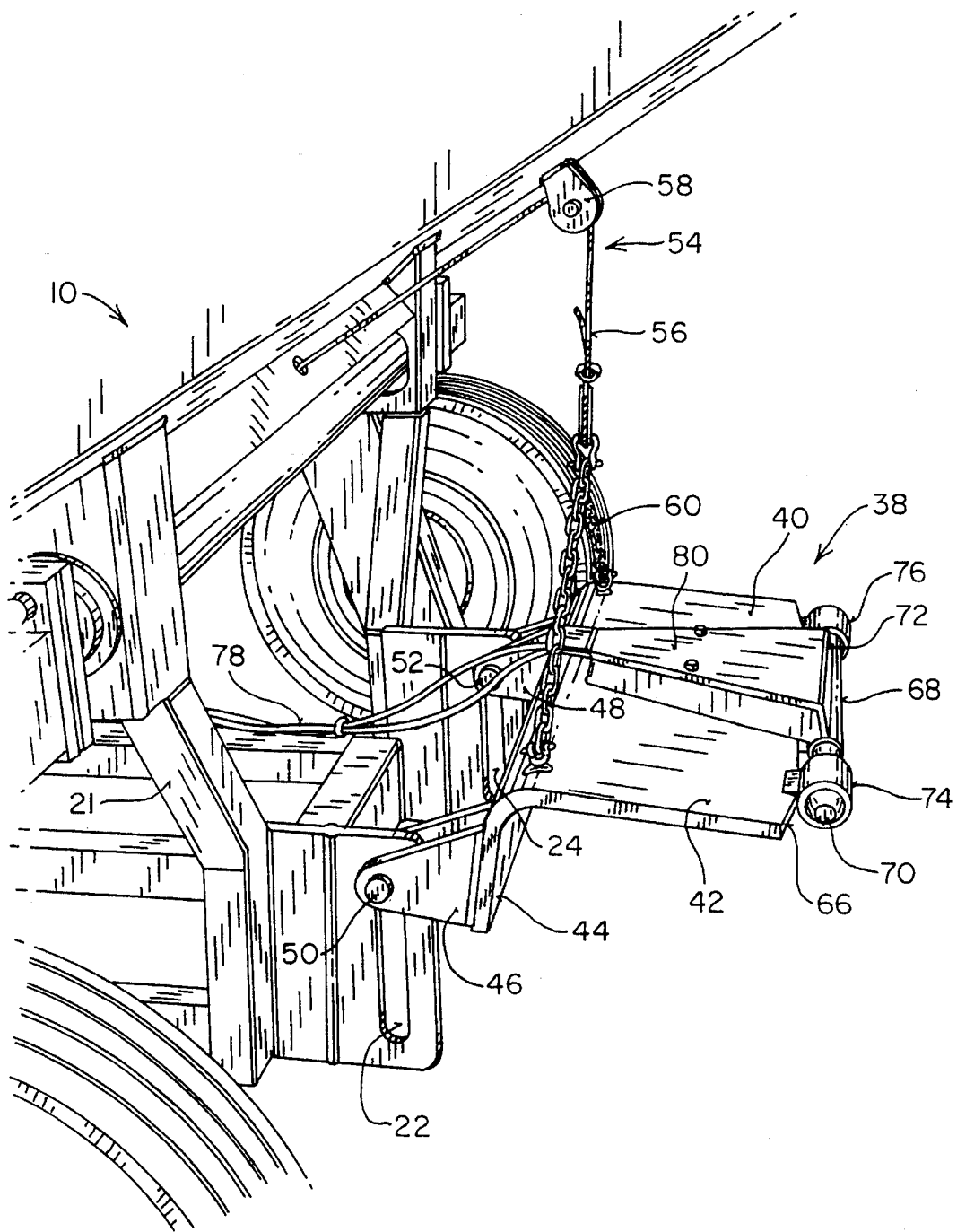
FIG _ 3

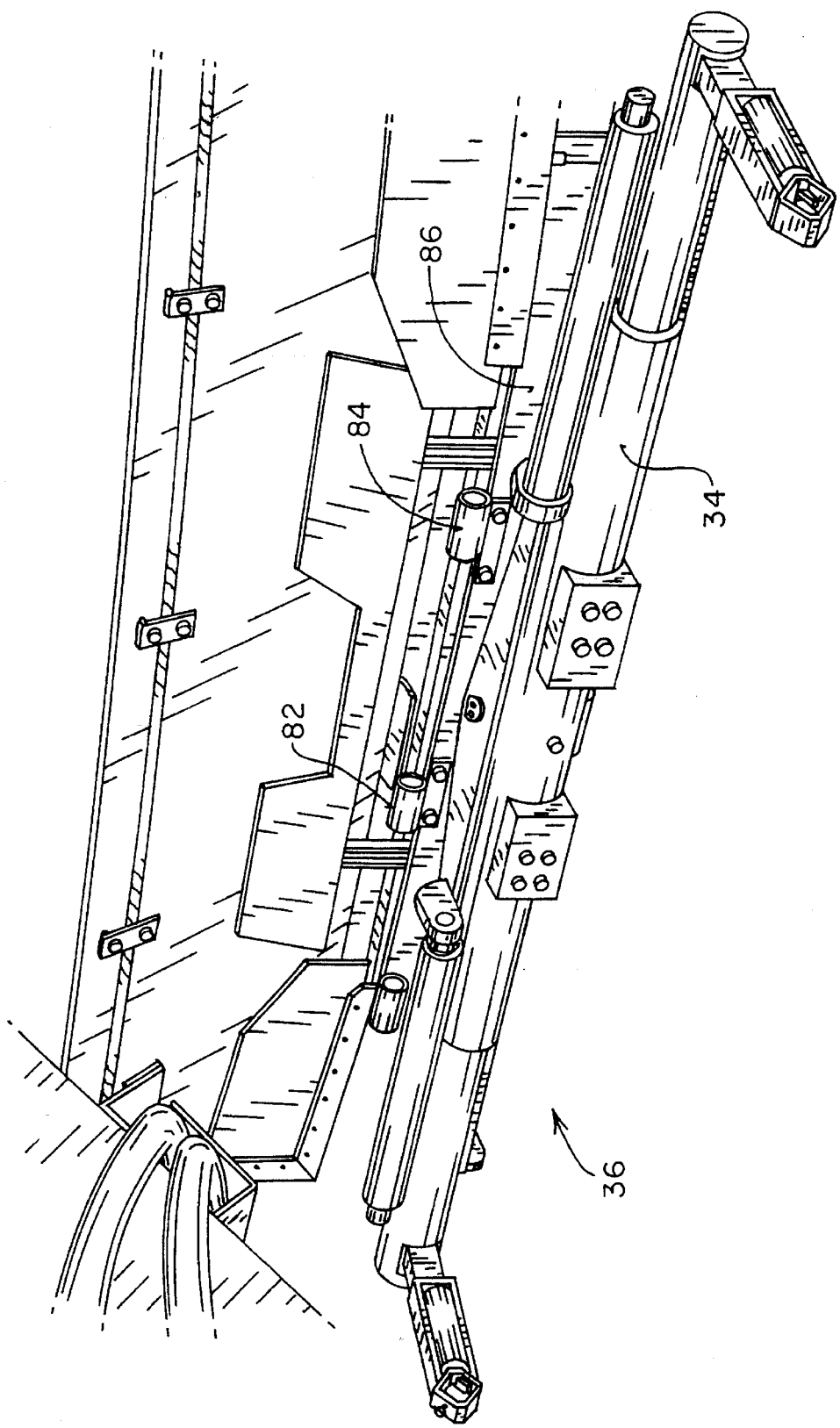

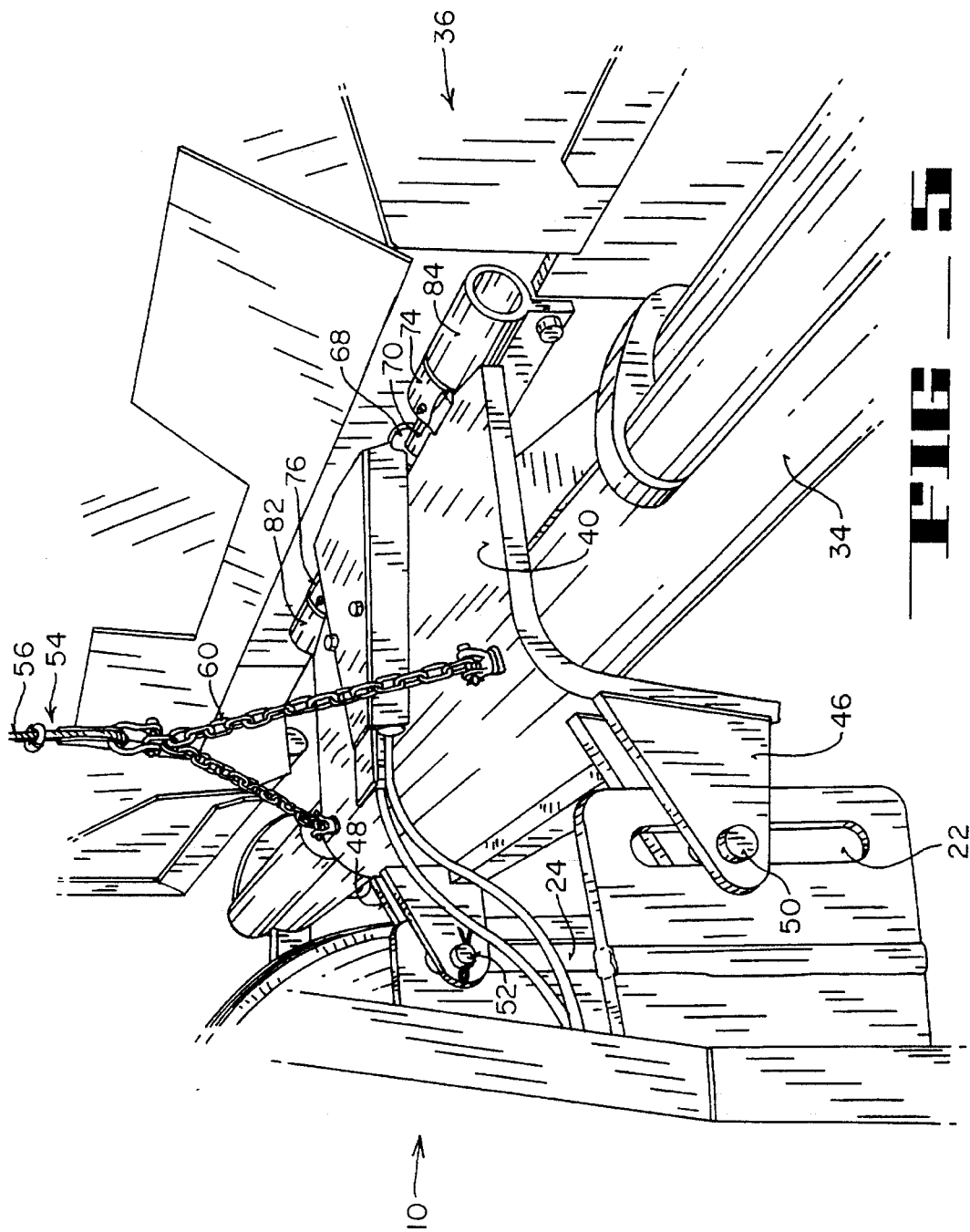

HITCHING MECHANISM

BACKGROUND OF THE INVENTION

1. Field of the Invention

This invention relates to a hitching mechanism for connecting two pieces of large equipment, and in particular, to a hitching mechanism that is operable from a location remote from the area of connection. Although the hitching mechanism of the invention can be used to connect a variety of machines or equipment, it will find its greatest use in paving operations, and more particularly, with the connection of a windrow elevator machine to a paving machine.

2. Description of the Background Art

Paving operations, including the pavement of roadways, parking lots, and the like, play an important part in today's transportation network. Most paving operations proceed by preparing a flat surface on the ground and then depositing, spreading, leveling and compacting a pavement material such as asphalt, gravel, cementitious aggregate mixes, and the like, over the prepared surface. To assist in such a process, many paving operations employ a paving machine such as PF-510 paver, commercially available from Blaw-Knox. Such a paver is a self-propelled machine having a hopper for receiving the pavement material. The pavement material is fed from the hopper to a screed which deposits the material on the prepared surface. As the paver is advanced, the material is spread, compacted and leveled by the paver to provide a uniform and durable surface.

When performing such a paving operation, the pavement material needs to be transported from a supply location and delivered to the paver's hopper. In one approach to filling the hopper, a rear dump truck is employed to transport the pavement material from the supply location and to the paver's receiving hopper. Because of the costs involved in filling the paver in such a manner, alternative procedures have been prepared to fill the paver's hopper. In one alternative procedure, the pavement material is delivered from the supply location in a bottom-dump trailer which dumps the pavement material in a windrow on the prepared surface ahead of the paver. To transfer the windrow of material into the paver's receiver hopper, a windrow elevator machine, such as a 660-H elevator machine, commercially available from Lincoln Manufacturing, is employed. The windrow elevator machine is pushed by the paver along the windrow of material to gather and lift the material directly into the receiving hopper of the paver.

An exemplary windrow elevator machine 10 is shown in FIG. 1. The elevator machine 10 includes an elevator chain 12 that is powered by a hydraulic system for transporting the windrow of pavement material from the ground and into the receiver hopper of the paver. As the elevator machine 10 is pushed by the paver, the windrow of material is scooped onto the elevator chain 12 at a front end 14 where it is elevated to a back end 16 and dropped into the paver's receiver hopper.

To provide a connection between the elevator machine 10 and the paver, the elevator machine 10 is provided with a pair of metal plates 18, 20 that are connected to a frame 21 at the back end 16. Each of the plates 18, 20 is provided with vertical elongate slot 22 and 24, respectively, for connecting a paving machine 36 (see FIG. 2). Shown in FIG. 2 is one embodiment of a conventional paving machine 36 having one type of a prior art connector for connecting the paving machine 36 to the paver 10. Other types of connectors exist which operate in a similar manner. The paving machine 36 includes a first pair of spaced-apart ears 30 and a second pair of spaced-apart ears 32. The pairs of ears 30, 32 are bolted to a front end 34 of the paving machine 36 and are provided with holes 31 for receiving pins 26, 28. To connect the paving machine 36 to the elevator machine 10, the paving machine 36 is advanced toward the elevator machine 10 until the plates 18, 20 are receiving between each of the ear pairs 30 and 32 and until the holes 31 are aligned with the slots 22 and 24. A worker is then positioned between the elevator machine 10 and the paving machine 36 to manually slide the pins 26, 28 through the holes 31 of each of the ear pairs 30, 32 and through the aligned elongate slots 22, 24, thereby providing a connection between the two machines 10, 36.

Connecting the elevator machine 10 to the paving machine 36 in this manner or a similar manner suffers from a number of serious drawbacks. For example, aligning the pairs of ears 30, 32 with the plates 18, 20 when advancing the paving machine 36 toward the elevator machine 10 is difficult and time-consuming. Furthermore, once the plates 18, 20 are received between the ears of each of the ear pairs 30, 32, further alignment is often necessary so that both pins 26, 28 can manually be inserted through both the holes 31 and the slots 22, 24. In a similar manner, separation of the machines 10, 36 can be difficult and time-consuming if the machines 10, 36 are not properly aligned. Improper alignment causes binding of the pins 26, 28 in the slots 22, 24, making their removal difficult, if not impossible, until the machines 10, 36 are properly realigned.

In another drawback, the prior art hitching arrangement illustrated in FIG. 2 provides a generally inflexible connection and therefore does not adequately account for ground height variations negotiated in many paving operations. Because of the inflexibility of the prior art hitch, operation of the machines 10, 36 on vertical offsetting surfaces often places an unacceptable and destructive load on one or both of the machines 10, 36. For example, a bridge deck surface can be located vertically above the roadway subgrade by about 10 inches or more. When negotiating such a bridge deck surface, the elevator machine 10 becomes vertically offset from the paving machine 36 thereby binding the pins 26, 28 in the slots 22, 24 and unduly stressing the frames of the machines 10, 36. Such stresses can easily reach or exceed their mechanical limits resulting in costly damage to the machines 10, 36.

Another drawback arises by requiring a worker to stand between the machines 10, 36 to insert or remove the pins 26, 28, sometimes placing the worker out of view of the paving machine operator. Serious injury could result to the worker in the unlikely event that safety procedures are violated causing accidental movement of the paving machine 36 with the worker positioned between the machines 10, 36.

Still another drawback is the manner in which the pairs of ears 30, 32 are connected to the paving machine 36. Usually, the pairs of ears 30, 32 are bolted to the paving machine 36 and are sized to mate only with a particular type of elevator machine. Hence, if the paving machine 36 is used with another piece of equipment (such as when filling the paving machine 36 with materials delivered from a rear dump truck), the pairs of ears 30, 32 must be unbolted from the paving machine 36 to accommodate the equipment used in the alternative feed method. The time and difficulty required to make such a change often discourages separation of the machines 10, 36 during ongoing paving operations, thereby limiting potential utilization of the bottom-dump transport and delivery procedure and increasing costs. In a further drawback, mounting of the pairs of ears 30, 32 to the paving machine 36 can require expensive modifications to the paving machine 36.

It would therefore be desirable to provide a hitching mechanism that would overcome or greatly reduce these and other problems. The hitching mechanism should allow for the easy and efficient connection of the two machines while at the same time reducing the risk of injury to the workers involved. In a particular aspect, the hitch should allow for the machines to negotiate surfaces having varied heights without placing excessive loads on either of the machines. The hitch should further allow for the accommodation of various makes and models of paving machines without complex or costly modifications to the paving machines. In still a further aspect, the hitch should allow for easy connection and removal of the machines so that different combinations of paving procedures are not discouraged.

SUMMARY OF THE INVENTION

The invention provides a connector for removably connecting a first piece of equipment to a second piece of equipment. The connector includes a rigid body having a back end and a front end. Means are provided at the back end of the body for slidable engagement in a vertical direction with the first piece of equipment. At least one axially translatable member is provided at the front end of the rigid body, with the translatable member being translatable between an insertion position and an engagement position. In this way, the translatable member can be used to engage the second piece of equipment when in the engagement position. The connector further includes a means that is operable from a location away from the body for translating the translatable member between the insertion position and the engagement position. In this manner, a worker can translate the translatable member into the engagement position while being safely located away from the engaging connection.

In one particular aspect, the connector is further provided with a means for raising and lowering the rigid body relative to the pieces of equipment. The means for raising and lowering preferably includes an elongate flexible member, such as a cable, a chain, a wire rope, and the like, that is attached to the rigid body between the front and the back ends. An actuator that is located away from the rigid body is further provided so that the flexible elongate member can be translated to raise or lower the rigid body. In this manner, a worker can manipulate and position the connector relative to the second piece of equipment while standing away from the connector.

In another aspect, the axially translatable member is cylindrical in geometry and is slidably mounted to the front end of the rigid body by a collar. The axially translatable member is mounted so that it can be received in a bushing that is mounted to a front end of the second piece of equipment when the member is aligned with the bushing and translated to the engagement position. Preferably, the second piece of equipment includes two spaced-apart bushings on its front end and the connector includes two axially translatable members. The translatable members are mounted to the rigid body in such a manner that they can be received into the bushings when aligned with the bushings and translated to the engagement position.

In a preferable aspect, the means for translating includes a hydraulic cylinder that is mounted on the body and an actuator that is located away from the body. The actuator is connected to the hydraulic cylinder so that the translatable member can be translated by a worker while standing away from the connector.

In another preferable aspect, the first piece of equipment includes at least one elongate vertical groove at its back end, and the slidable engagement means at the back end of the body includes at least one pair of ears with a pin extending therebetween. The pin is received in the elongate groove and held by the ears to slidably connect the body to the first piece of equipment. In this way, the rigid body is vertically positionable relative to the first piece of equipment. In still a further aspect, the rigid body is preferably L-shaped in geometry with the back end being substantially perpendicular to the front end.

The invention further provides a system for laying road pavement. The system includes a windrow elevator machine having a front end and back end and a paving machine having a front end for pushing the elevator machine. A connector is provided for removably connecting the front end of the paving machine to the back end of the elevator machine. The connector is provided with a rigid body having a first end and a second end. Means are included at the first end of the body for slidable engagement in a vertical direction with the back end of the elevator machine. At least one axially translatable member is provided at the second end of the rigid body for engagement with the front end of the paving machine. The translatable member is translatable between an insertion position and an engagement position. A means that is operable from the elevator machine is provided for translating the translatable member between the insertion position and the engagement position. In this way, a worker can translate the member to the engagement position to engage the connector with the paving machine while standing at a safe location beside the elevator machine.

The system further includes a means for raising and lowering the rigid body relative to the elevator machine and the paving machine. Preferably, the means for raising and lowering includes a cable that is attached to the rigid body between the first and second ends. The cable extends from the body to a translating mechanism on the elevator machine that is able to translate the cable to raise or lower the connector. An actuator is provided on the elevator machine for actuating the translating mechanism. In this way, the worker can orient and position the connector for engagement with the paving machine while standing at a safe location beside the elevator machine.

In one aspect, the axially translatable member is cylindrical in geometry and is slidably mounted to the second end of the rigid body by a collar. Preferably, the paving machine includes at least one bushing mounted on the front end for receiving the translatable member when aligned with the member and the member is translated to the engagement position.

In a preferable aspect, the paving machine includes two spaced-apart bushings on the front end and the connector includes two corresponding axially translatable members. In this way, each translatable member can be received into one of the bushings when aligned with the bushings and translated to the engagement position.

In one aspect, the means for translating includes a hydraulic cylinder on the body and an actuator that is connected to the hydraulic cylinder. The actuator is located on the elevator machine so that a worker can operate the cylinder to translate the members while standing safely beside the elevator machine. In another aspect, at least one vertical elongate groove is provided at the back end of the elevator machine, and the slidable engagement means at the first end of the body includes at least one pair of ears with a pin extending therebetween. The pin is slidably received in the elongate vertical groove. In this manner, a pivotal connection is provided between the elevator machine and the connector. Another pivotal connection is provided between the connector and the paving machine at the bushing, thereby allowing the machines to operate on different ground levels without subjecting the connections to excessive stresses. Conveniently, the connection at the vertical groove also allows for easy raising and lowering of the connector when attempting to align the translatable member with the bushing on the paving machine. In a preferable aspect, the rigid body is L-shaped in geometry with the first end being substantially perpendicular the second end.

The invention provides a hitch having a rigid body with a first planar member and a second planar member. Preferably, the planar members are substantially perpendicular to each other. Attached to the first planar member is a means for slidably connecting the rigid body to an elevator machine so that the rigid body is free to move in a vertical direction relative to the elevator machine when connected thereto. In one preferable aspect, the connecting means includes two pairs of ears that are attached at opposite ends of the first planar member, with each pair of ears having a pin extending therebetween. Other configurations for connection to the elevator machine are available, with a primary feature being that the body be able to slide vertically and/or pivot relative to the elevator machine when connected thereto. A pair of axially translatable members are slidably attached to the second planar member by a pair of collars. A means is provided for translating the members away from each other, with the translation means being operable from a location remote from the hitch. A cable can be further provided for raising or lowering the body. In one aspect, the means for translating includes a hydraulic cylinder.

BRIEF DESCRIPTION OF THE DRAWINGS

FIG. 2 is a perspective view of a back end of the windrow elevator machine of FIG. 1 connected to a paving machine using a prior art hitching mechanism.

FIG. 3 is a perspective view of the windrow elevator machine of FIG. 1 having a hitching mechanism according to the present invention.

FIG. 4 is a perspective view of a front end of a paving machine having a pair of bushings for receiving the hitching mechanism of FIG. 3 according to the present invention.

FIG. 5 is a perspective view of the windrow elevator machine of FIG. 1 that is connected to the paving machine of FIG. 4 using the hitching mechanism of FIG. 3 according to the present invention.

DETAILED DESCRIPTION OF THE SPECIFIC EMBODIMENTS

Figure 1:
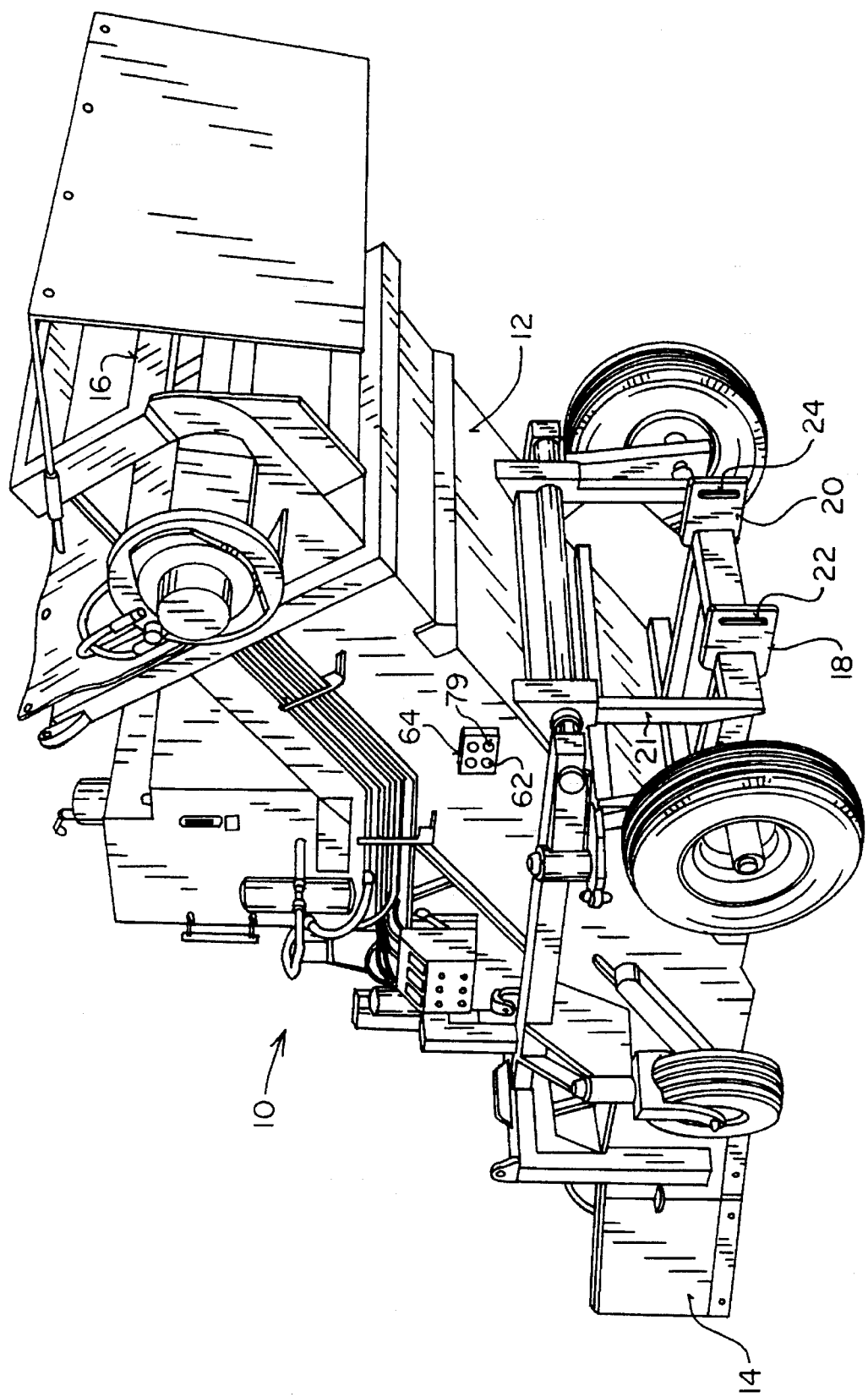
FIG. 1 is a perspective view of a conventional windrow elevator machine.

Referring to FIG. 3, an exemplary hitching mechanism 38 will be described. Although the hitching mechanism 38 can be used to connect a variety of machinery and equipment, for convenience of discussion, the hitching mechanism 38 will be described in connection with the windrow elevator machine 10 and the paving machine 36 (without the prior art pairs of ears 30, 32).

The hitching mechanism 38 includes a rigid body 40 that is preferably constructed of steel. The rigid body 40 is L-shaped in geometry and includes a top planar member 42 and a side planar member 44. Attached at opposite ends of the side planar member 44 are two pairs of ears 46, 48. Extending between each of the pairs of ears 46, 48 are pins 50, 52, respectively. The pins 50, 52 are received in the vertical elongate slots 22, 24 so that the body 40 can slide in a vertical direction between the slots 22, 24.

An exemplary feature of the hitching mechanism 38 is that the pairs of ears 46, 48 and the pins 50, 52 can be slidably connected to the plates 18, 20 without alteration of the elevator machine 10. In this manner, the hitching mechanism 38 can be used with existing windrow elevator machines and models currently being manufactured which are usually provided with vertical elongate slots similar to the slots 22 and 24.

To raise and lower the body 40 while held in the slots 22, 24, a lifting mechanism 54 is provided. The lifting mechanism 54 includes a cable 56 that is connected at one end to a hydraulic cylinder (not shown) having one end pivot mounted to the center frame 21 of the elevator machine 10. The other end of the cylinder is attached to the cable 56. The cable 56 extends from the hydraulic cylinder, along the body of the elevator machine 10, over a pulley 58, and downward to a bridle 60 that is attached to the top planar member 42 of the body 40. As the hydraulic cylinder is retracted, the cable 56 is translated to raise the body 40. Conversely, as the cylinder is extended, the cable 56 is translated in the opposite direction and the body 40 is lowered by its own weight. As the body 40 is raised and lowered, its travel is guided in part by the slots 22, 24. The slots 22, 24 also allow the body 40 to experience some pivoting about the pins 50, 52 as described in greater detail hereinafter.

Power is provided to the hydraulic cylinder that translates the cable 56 by an auxiliary pump (not shown) which is incorporated into the hydraulic system powering the elevator machine's elevator chain 12 (see FIG. 1). An actuator 62 for the lifting mechanism 54 can conveniently be provided on a control panel 64 (see FIG. 1) on the elevator machine 10. In this manner, a worker can raise or lower the body 40 while standing beside the elevator machine 10 at the control panel 64. The control panel 64 is near the hitching mechanism 38 so that the worker can view the movement of the body 40. This eliminates the need to position the worker between the elevator machine 10 and the paving machine 36 when attempting to connect the two machines. Safety is therefore improved by eliminating the need for the worker to position himself in the unsafe space between the two machines 10, 36.

The lifting mechanism 54 is usually only employed during hitching and unhitching of the machines 10, 36. During operation of the machines 10, 36, the cylinder is extended so that the cable 56 does not experience a load. In this way, undesirable forces are not placed on the lifting mechanism 54 which could damage the lifting mechanism 54 or even the machines 10 and 36 during paving operations.

Fixedly mounted to a front edge 66 of the top planar member 42 is a hydraulic cylinder 68. The hydraulic cylinder 68 includes a pair of cylindrical extension members 70, 72 that are axially translated away from the cylinder 68 when a pressure is supplied to the cylinder 68. The extension members 70, 72 are slidably held in a pair of collars 74, 76 that are in turn rigidly connected to the front edge 66. When the hydraulic cylinder 68 is actuated, each of the extension members 72 are translated away from the hydraulic cylinder 68 until they extend beyond the collars 74, 76 and into an engagement position. When the members 70, 72 are retracted, they become aligned with or are withdrawn into the collars 74, 76. In this configuration, the extension members 70, 72 are in an insertion position. The hydraulic cylinder 68 is powered by an auxiliary pump that is incorporated into the elevator machine's hydraulic system, and can be the same pump that powers the elevator machine's elevator chain 12. Supply lines 78 are connected to the hydraulic cylinder 68 to place the cylinder 68 in communication with the auxiliary pump. A cover 80 is conveniently provided to protect the supply lines 78. Operation of the cylinder 68 occurs by operating an actuator 79 on the control panel 64.

Referring to FIG. 4, configuration of the paving machine 36 for connection with the hitching mechanism 38 will be described. The paving machine 36 is provided with a pair of bushings 82, 84 that are attached to a mainframe 86 of the paving machine 36 at its front end 34. The bushings 82, 84 are for receiving the extension members 70, 72 when translated into the engagement position. A particular advantage of the bushings 82, 84 is that they can easily be attached to various types and models of paving machines without substantial or costly alteration of the machines. In this way, the hitching mechanism 38 can be attached to a variety of paving machines by merely modifying the paving machines to include the bushings 82, 84. Unlike the pairs of ears 30, 32 in the prior art connecting mechanism, the bushings 82, 84 can be made universal in size so that they do not need to be removed or replaced when the paving machine 36 is used with other machines or equipment. Instead, any machine or piece of equipment having the hitching mechanism 38 can be connected to another machine having the bushings 82, 84.

To connect the paving machine 36 to the elevator machine 10, the lifting mechanism 54 is employed to lift the body 40 until the extension members 70, 72 are at about the same height as the bushings 82, 84. The paving machine 36 is then advanced toward the elevator machine 10 with the extension members 70, 72 being in the insertion position so that they will not prematurely engage the bushings 82, 84. As shown in FIG. 5, the paving machine 36 is advanced until the bushings 82, 84 become aligned with the collars 74, 76. As the paving machine 36 approaches the body 40, the lifting mechanism 54 can be used to readjust the height of the extension members 70, 72 to assist in their alignment with the bushings 82, 84. Once properly aligned, the hydraulic cylinder 68 is actuated by operating the actuator 79 to axially translate the extension members 70, 72 into the engagement position within the bushings 82, 84. In the engagement position, a hinged connection is formed between the body 40 and the paving machine 36. The lifting mechanism 54 can then be employed to remove the tension from the cable 56. To disconnect the elevator machine 10 from the paving machine 36, the extension members 70, 72 can be withdrawn into the collars 74, 76 by operating the actuator 79. The paving machine 36 can then be driven away from the elevator machine 10.

By providing the hitching mechanism 38 in this manner, a number of significant advantages are provided. One particular advantage is that the hitching mechanism 38 is operated from the control panel 64 to both align the collars 74, 76 of the body 40 with the bushings 82, 84 of the paving machine 36 and to engage the extension members 70, 72 with the bushings 82, 84. This improves safety by eliminating the need to enter the space between the machines 10 and 36 while hitching or releasing the machines. Another advantage is the flexibility of the connection provided by the L-shaped geometry of the body 40 in combination with the connection points at the slots 22, 24 and at the bushings 82, 84. Once connected and in operation, the hitching mechanism 38 has a hinged connection at the front edge 66 so that the body 40 can rotate within the bushings 82, 84. At the opposite end of the body 40, the body 40 can be translated in a vertical direction within the slots 22, 24 as well as being able to experience some pivotal rotation about the pins 50 and 52. Such connections in combination with the L-shaped geometry of the body 40 provide for flexibility when operating the machines 10, 36 in various terrains as well as providing a rugged and durable connection between the machines 10, 36. In this way, a flexible and workable connection is provided between the machines 10, 36 so that undue stresses are not placed on the hitching mechanism 38 or the machines 10, 36 during operation. For example, such connections allow the machines 10, 36 to more easily negotiate changing grade conditions such as those encountered at bridge approaches without binding the hitching mechanism 38 and damaging the machines 10, 36. The L-shaped configuration of the body 40 is also instrumental in transferring forces from the paving machine 36 to the elevator machine 10 as the paving machine 36 pushes the elevator machine 10. The L-shaped geometry further assists in allowing for easy alignment of the extension members 70, 72 with the bushings 82, 84 when connecting the body 40 to the paving machine 36. By placing the extension members 70, 72 on the front edge 66, the members 70, 72 are generally parallel with the bushings 82, 84. As the paving machine 36 is advanced toward the elevator machine 10, the collars 74, 76 can easily slide between the bushings 82, 84 and be aligned therewith. The bridle 60 also assists in this alignment by providing sufficient "slosh", i.e. vertical and horizontal movement, to the rigid body 40 at the front edge 66 so that when the collars 74, 76 engage the bushings 82, 84, they can adjust themselves to slide between the space between the bushings 82 and 84.

A further advantage of the invention is that the hitching mechanism 38 allows for rapid and convenient hitching and unhitching of the machines 10, 36. In this way, incentive is provided for using the windrower procedure for filling the paver's receiving hopper which is less costly than the end-dumping procedure. For example, when paving a location having a cul-de-sac using the prior art hitching arrangement, an end-dumping procedure is usually employed for the entire project since disconnection of a elevator machine from the paving machine and its subsequent reconnection in order to accommodate the limited space provided by the cul-de-sac is so undesirable. With the hitching mechanism 38 of the present invention, the less costly bottom-dump windrow procedure can be employed since the paving machine 36 can easily be disconnected from the elevator machine 10 when required to pave the cul-de-sac.

Although the foregoing invention has been described in detail by way of illustration and example, for purposes of clarity of understanding, it will be obvious that certain changes and modification may be practiced within the scope of the appended claims.

What is claimed is:

1. A connector for removably connecting a first piece of equipment to a second piece of equipment, the connector comprising:

a rigid body having a back end and a front end;

means at the back end of the body adapted for slidable engagement in a vertical direction with the first piece of equipment;

at least one axially translatable member at the front end of the rigid body, the translatable member being translatable between an insertion position and an engagement position, wherein the translatable member is adapted for engagement with the second piece of equipment when in the engagement position; and means operable from a location away from the body for translating the translatable member between the insertion position and the engagement position.

2. The connector of claim 1, further comprising means for raising and lowering the rigid body relative to the pieces of equipment.

3. The connector of claim 2, wherein the means for raising and lowering comprises an elongate flexible member attached to the rigid body between the front and the back ends and an actuator located away from the rigid body.

4. The connector of claim 1, wherein the axially translatable member is cylindrical in geometry and is slidably mounted to the front end of the rigid body by a collar.

5. The connector of claim 4, wherein the second piece of equipment includes a front end having at least one bushing mounted thereon, and wherein the axially translatable member adapted to be received in the bushing when aligned with the bushing and translated to the engagement position.

6. The connector of claim 5, wherein the second piece of equipment includes two spaced-apart bushings on the front end, and wherein the connector includes two axially translatable members, each translatable member being adapted to be received into one of the bushings when aligned with the bushings and translated to the engagement position.

7. The connector of claim 1, wherein the means for translating includes a hydraulic cylinder on the body and an actuator connected to the hydraulic cylinder and located away from the body.

8. The connector of claim 1, wherein the first piece of equipment defines at least one elongate vertical groove, and wherein the slidable engagement means at the back end of the body comprises at least one pair of ears with a pin extending therebetween, the pin being adapted to slide in the elongate vertical groove.

9. The connector of claim 1, wherein the rigid body is L-shaped in geometry with the back end being substantially perpendicular to the front end.

10. A system for laying road pavement, the system comprising:

a windrower elevator machine having a front end and a back end;

a paving machine having a front end for pushing the elevator machine and a back end; and a connector for removably connecting the front end of the paving machine to the back end of the elevator machine, wherein the connector comprises:

a rigid body having a first end and a second end;

means at the first end of the body for slidable engagement in a vertical direction with the back end of the elevator machine;

at least one axially translatable member at the second end of the rigid body for engagement with the front end of the paving machine, the translatable member being translatable between an insertion position and an engagement position; and means operable from the elevator machine for translating the translatable member between the insertion position and the engagement position.

11. The system of claim 10, further comprising means for raising and lowering the rigid body relative to the elevator machine and the paving machine.

12. The system of claim 11, wherein the means for raising and lowering comprises a cable attached to the rigid body between the first and the second ends, the cable extending from the body to a mechanism on the elevator machine for translating the cable, and an actuator on the elevator machine for actuating the mechanism.

13. The system of claim 10, wherein the axially translatable member is cylindrical in geometry and is slidably mounted to the second end of the rigid body by a collar.

14. The system of claim 13, wherein the paving machine includes at least one bushing mounted on the front end, and wherein the axially translatable member is mounted to the second end of the rigid body so that the translatable member can be received in the bushing when aligned with the bushing and translated to the engagement position.

15. The system of claim 14, wherein the paving machine includes two spaced-apart bushings on the front end, and wherein the connector includes two axially translatable members, each translatable member being received into one of the bushings when aligned with the bushings and translated to the engagement position.

16. The system of claim 10, wherein the means for translating includes a hydraulic cylinder on the body and an actuator connected to the hydraulic cylinder, the actuator being located on the elevator machine.

17. The system of claim 10, wherein the back end of the elevator machine defines at least one vertical elongate groove, and wherein the slidable engagement means at the first end of the body comprises at least one pair of ears with a pin extending therebetween, the pin being slidably received in the elongate vertical groove.

18. The system of claim 10, wherein the rigid body is L-shaped in geometry with the first end being substantially perpendicular to the second end.

19. A hitch comprising:

a rigid body having a first planar member and a second planar member;

two pairs of ears attached at opposite sides of the first planar member, each pair of ears having a pin extending therebetween;

a pair of axially translatable members slidably attached to the second planar member by a pair of collars; and means for translating the members away from each other, the translation means being operable from a location remote from the hitch.

20. The hitch of claim 19, wherein the planar members are substantially perpendicular to each other.

21. The hitch of claim 20, further comprising a cable attached to the second planar member for raising and lowering the body.

22. The hitch of claim 19, wherein the means for translating includes a hydraulic cylinder.

* * * * *